(12) United States Patent
Li et al.

(10) Patent No.: US 8,914,010 B2
(45) Date of Patent: Dec. 16, 2014

(54) METHOD AND MOBILE TERMINAL FOR CONTROLLING APPLICATION IN THE MOBILE TERMINAL

(75) Inventors: Tangsuo Li, Nanjing (CN); Jianfeng Wang, Nanjing (CN); Feilong Bao, Nanjing (CN)

(73) Assignee: Samsung Electronics Co., Ltd (KR)

( * ) Notice: Subject to any disclaimer, the term of this patent is extended or adjusted under 35 U.S.C. 154(b) by 357 days.

(21) Appl. No.: 13/398,248

(22) Filed: Feb. 16, 2012

(65) Prior Publication Data

US 2012/0208555 A1    Aug. 16, 2012

(30) Foreign Application Priority Data

Feb. 16, 2011  (CN) .......................... 2011 1 0041328

(51) Int. Cl.
| | | |
|---|---|---|
| *H04B 17/00* | (2006.01) | |
| *H04M 3/00* | (2006.01) | |
| *H04W 24/00* | (2009.01) | |
| *H04B 1/38* | (2006.01) | |
| *G09G 5/00* | (2006.01) | |
| *G06F 3/041* | (2006.01) | |
| *G09G 5/02* | (2006.01) | |
| *G06F 1/16* | (2006.01) | |
| *G06F 3/0346* | (2013.01) | |
| *G06F 3/01* | (2006.01) | |
| *H04M 1/725* | (2006.01) | |

(52) U.S. Cl.
CPC .............. *G06F 3/017* (2013.01); *G06F 1/1694* (2013.01); *H04M 1/72583* (2013.01); *H04M 2250/12* (2013.01); *H04M 1/72522* (2013.01); *G06F 3/0346* (2013.01)
USPC ...................... 455/418; 455/67.11; 455/414.1; 455/456.1; 455/566; 455/567; 345/156; 345/173; 345/592; 345/596

(58) Field of Classification Search
USPC ................... 455/67.11, 418, 456.1, 566, 567; 345/156, 173, 592, 596
See application file for complete search history.

(56) References Cited

U.S. PATENT DOCUMENTS

| | | | |
|---|---|---|---|
| 2009/0303204 A1* | 12/2009 | Nasiri et al. .................. | 345/184 |
| 2011/0304534 A1* | 12/2011 | Zhang ............................ | 345/156 |

FOREIGN PATENT DOCUMENTS

WO    WO 2005/103863    11/2005

\* cited by examiner

*Primary Examiner* — Inder Mehra
(74) *Attorney, Agent, or Firm* — The Farrell Law Firm, P.C.

(57) ABSTRACT

A method of controlling applications in a mobile terminal is provided. The method includes collecting acceleration values continuously using an acceleration sensor, when the mobile terminal is being moved; identifying a motion trace indicating that the mobile terminal has been moved from the collected acceleration values; matching the identified motion trace with a preset motion trace, and executing a control command mapped to the preset motion trace to control an application in the mobile terminal, if the matching succeeds.

14 Claims, 7 Drawing Sheets

METHOD AND MOBILE TERMINAL FOR CONTROLLING APPLICATION IN THE MOBILE TERMINAL

PRIORITY

This application claims priority under 35 U.S.C. §119(a) to a Chinese Patent Application filed in the State Intellectual Property Office of the People's Republic of China on Feb. 16, 2011 and assigned Ser. No. 201110041328.4, the entire disclosure of which is incorporated herein by reference.

BACKGROUND OF THE INVENTION

1. Field of the Invention

The present invention relates generally to mobile terminals and, more particularly, to a method and an apparatus for controlling applications in a mobile terminal.

2. Background of the Invention

Various mobile terminals such as a mobile terminal, a tablet computer, and a smart phone increasingly include more functions and, specifically, not only basic communications services, such as calling, but also various applications can be implemented. When an application is to be started or exited, a user performs the operation of start or exit by selecting the menus provided by the mobile terminal level by level. However, such operation is inconvenient.

Some high-end mobile terminals also allow users to control special functions in applications in the mobile terminals. For example, a user may zoom into a picture or control a game by shaking the terminal. However, all of these controls are simple. More and more demands on control of applications have been made. Thus, it is difficult for simple shaking of the terminal to meet more complex user demands.

SUMMARY OF THE INVENTION

Accordingly, the present invention provides a method capable of easily controlling various applications of mobile terminals and the mobiles terminals.

The present invention also provides a method for controlling applications of mobile terminal by user writing with the mobile terminal and the mobile terminal.

In accordance with an aspect of the present invention, a method of controlling applications in a mobile terminal is provided. The method includes collecting acceleration values continuously using an acceleration sensor, when the mobile terminal is being moved; identifying a motion trace indicating that the mobile terminal has been moved from the collected acceleration values; matching the identified motion trace with a preset motion trace, and executing a control command mapped to the preset motion trace to control an application in the mobile terminal, if the matching succeeds.

In accordance with another aspect of the present invention, a mobile terminal is provided. The terminal includes an acceleration sensor for detecting an acceleration when the mobile terminal is being moved; and a controller for collecting acceleration values using the acceleration sensor continuously when the mobile terminal is being moved, identifying a motion trace that the mobile terminal has been moved from the collected acceleration values, matching the identified motion trace with a preset motion trace, and executing a control command mapped to the preset motion trace if the matching succeeds, to control applications in the mobile terminal.

Thus, according to the present invention, a user can write any types of characters and pictures, not only simple shakes with a handheld mobile terminal. Therefore, motion traces can be formed and control commands can thereby be mapped by the motion traces. Consequently, it is possible to easily control various applications in the mobile terminal by a user writing with a handheld mobile terminal.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention will be described with reference to the accompanying drawings. In the following description, a detailed explanation of known related functions and constitutions may be omitted to avoid unnecessarily obscuring the subject matter of the present invention.

Hereinafter, although embodiments of the present invention will be described with reference to a mobile terminal as an example, the embodiments of the present invention may be applied to other similar apparatuses. Further, embodiments of the present invention may be applied to other apparatuses by those skilled in the arts through some modifications without departing from the spirit and scope of the present invention.

Figure 1:
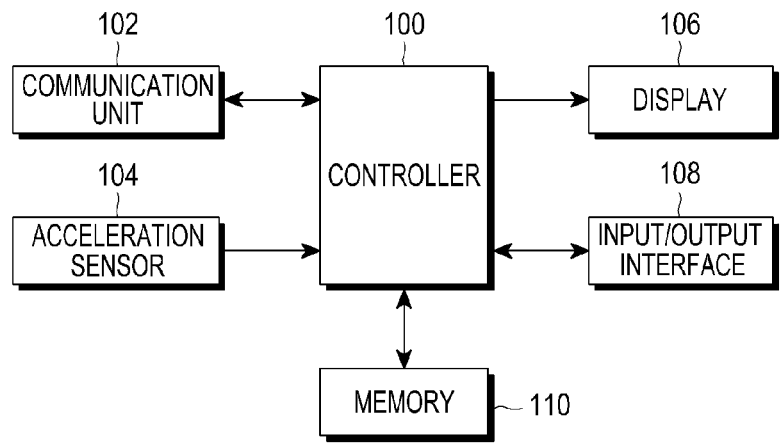
FIG. 1 illustrates a mobile terminal according to embodiments of the present invention.

FIG. 1 is a block diagram of a mobile terminal according to embodiments of the present invention. Referring to FIG. 1, a controller 100 executes a function of a mobile terminal and also performs an application control according to embodiments of the present invention. When a user writes using the mobile terminal, the controller 100 identifies motion traces that the mobile terminal has been moved, from accelerations detected by an acceleration sensor 104. When the identified motion traces are matched with a preset motion trace, a corresponding application is controlled by executing a control command mapped to the preset motion trace.

A communication unit 102 performs communication for a data communication function and a phone call executed by the controller 100. The acceleration sensor 104 detects the acceleration when the mobile terminal moves. A display 106 displays a screen according to the movement of the mobile terminal by a control of the controller 100. An input/output interface 108 provides a user interface for an input and an output by the user for the controller 100. A memory 110 stores data according to an execution by the controller 100 and stores acceleration values detected by the acceleration sensor 104. The memory 110 may further include an external memory or further include a storage device such as a Hard Disk Drive (HDD).

Figure 2:
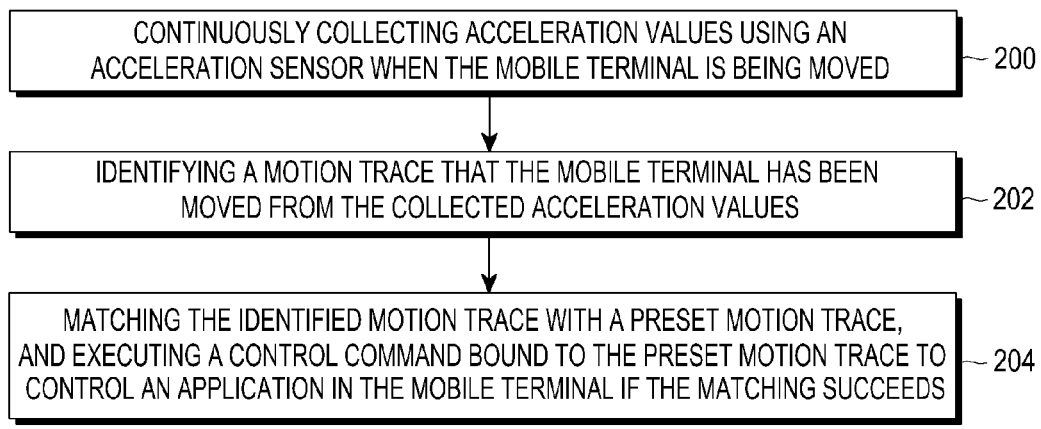
FIG. 2 illustrates a flowchart according to a first embodiment of the present invention.

FIG. 2 shows a flowchart according to an embodiment of the present invention. Referring to FIG. 2, the controller 100 continuously collects acceleration values using an acceleration sensor 104 when the mobile terminal is being moved in step 200.

In practical applications, accelerations occur in the mobile terminal in general when a user holds a mobile terminal and writes with the handheld mobile terminal in a space. The acceleration sensor 104 detects an acceleration of the mobile terminal. A detected acceleration value is a vector including scalar quantity values on the coordinate axes of a three-dimensional space, i.e., a value on the X-axis, the Y-axis and the Z-axis.

In step 202, the controller 100 identifies a motion trace indicating that the mobile terminal has been moved from the collected acceleration values.

The detected acceleration values are representative of the accelerations of the mobile terminal and cannot represent a motion trace. However, a plurality of continuous accelerations can represent a certain trend of the motion of the mobile terminal. Thus, in this step, a motion trace of the mobile terminal can be identified.

This method is described by taking the X-axis as an example. Assuming that an acceleration value on the X-axis of the mobile terminal is detected as 2 when the mobile terminal is moved to point A, an acceleration value on the X-axis of the mobile terminal is detected as 4 when the mobile terminal is moved to point B, and an acceleration value on the X-axis of the mobile terminal is detected as 6 when the mobile terminal is moved to point C during continuous detection, it can be derived that the mobile terminal is moved in the X-axis positive direction at all of points A, B and C and is moved in the positive direction from point A to point B, and then point C. A motion trace described in the present invention means a shape of trace formed by motion trends, rather than a trace formed by positions in the three-dimensional space where the mobile terminal is. Description is given only by taking the X-axis as the sample. Processing on the Y-axis and the Z-axis is similar to that on the X-axis and will not be described herein.

The method of identifying a motion trace is described in detail below.

First, it is assumed that a first storage space, a second storage space and a third storage space provided by the memory 110 are used to store respective sampled values. Among these storage spaces, the first storage space includes M groups of subspaces to store M groups of values on the X-axis, the second storage space includes M groups of subspaces to store M groups of values on the Y-axis, and the third storage space includes M groups of subspaces to store M groups of values on the Z-axis. Thus, when step 200 is carried out, the acceleration sensor 104 performs sampling at a preset time interval. In other words, at a certain sampling frequency, when the mobile terminal is being moved and stores values on the X-axis obtained in the sampling in the M groups of subspaces of the first storage space, stores values on the Y-axis obtained in the sampling in the M groups of subspaces of the second storage space, and stores values on the Z-axis obtained in the sampling in the M groups of subspaces of the third storage space. Herein, M is a positive integer greater than or equal to 1.

With the sampled data stored in the above manner, the values on the X-axis, the Y-axis, and the Z-axis can be separately processed as follows to identify a motion trace.

I) For values in the first storage space, i.e., collected values (scalar quantity values) on the X-axis, M respective X-axis motion identifiers are determined based on values in the M groups of subspaces. An X-axis motion identifier is 1, −1 or 0.1 denotes motion in the X-axis positive direction, −1 denotes motion in the X-axis negative direction, and 0 denotes no motion on the X-axis.

II) For values in the second storage space, i.e., collected values (scalar quantity values) on the Y-axis, M respective Y-axis motion identifiers are determined based on values in the M groups of subspaces. A Y-axis motion identifier is 1, −1 or 0.1 denotes motion in the Y-axis positive direction, −1 denotes motion in the Y-axis negative direction, and 0 denotes no motion on the Y-axis.

III) For values in the third storage space, i.e., collected values (scalar quantity values) on the Z-axis, M respective Z-axis motion identifiers are determined based on values in the M groups of subspaces. A Z-axis motion identifier is 1, −1 or 0.1 denotes motion in the Z-axis positive direction, −1 denotes motion in the Z-axis negative direction, and 0 denotes no motion on the Z-axis.

That is, no matter whether the values on the X-axis are positive, negative or zero, they represent a motion trace formed of motion trends on the X-axis so long as they are converted into M motion identifiers. This is because, assuming that there is one piece of sampled data in each of the groups of subspaces and the groups of subspaces are stored successively in a certain order, e.g., an order of group 1 to group M, as described above, if a sampled value is positive, it is converted into a motion identifier 1, which represents motion in the X-axis positive direction; if a sampled data is negative, it is converted into a motion identifier −1, which represents motion in the X-axis negative direction; if a sampled data is 0, it is kept unchanged and represents no motion on the X-axis. Thus, M successive converted motion identifiers can represent a motion trend on the X-axis. For values on the Y-axis and Z-axis, they can be converted into motion identifiers based on the above principle to represent a motion trend on the Y-axis/Z-axis.

Specifically, at least the following two methods are available to perform the above determining of M motion identifiers.

A first method: directly determining M motion identifiers based on values in M groups of subspaces, respectively. This method is the same as that in the above example. As another example, supposing that there are 8 groups of subspaces in a first storage space and values in the 8 groups.

of subspaces are 1, 2, 4, −2, −4, 2, 3 and 4, respectively, a motion identifier corresponding to a positive number is set as 1, a motion identifier corresponding to a negative number is set as −1, while a motion identifier corresponding to 0 is set as 0. Thus, the motion identifiers corresponding to the 8 groups of subspaces in the first storage space are 1, 1, 1, −1, −1, 1, 1, and 1, respectively. Values in the second storage space or third storage space are processed in the same manner. In sum, in the first method, motion identifiers are determined directly based on values in M groups of subspaces. Moreover, in the above example, it is assumed that M is equal to 8 and there is only one sample value in each subspace, while in practical HI applications, M and a number of sampled value in each subspace vary with sampling methods.

A second method: determining M motion identifiers based on values in M groups of subspaces, a still value (i.e., representing that the terminal is not being moved), and a threshold value. In this method, an acceleration sensor 104 determines the mobile terminal's not being moved as being moved by mistake due to factors such as inaccurate operation of the user and/or an error of the sensor and thereby obtain a certain sampled value when a user writes with a handheld mobile terminal. To eliminate this error, a still value representing the terminal not being moved and a threshold value are set. A sampled value is compared with the still value. If the difference between the sampled value and the still value falls within a range of the threshold value, the mobile terminal is regarded as not having been moved. If the difference falls outside the range of the threshold value, the mobile terminal is determined as having been moved in a positive or negative direction based on the particular case.

Additionally, in order to increase accuracy of the identification, a high sampling frequency is set for more samples. To make processing more convenient, N data units can be provided in each subspace to store sampled values that have been obtained. For example, each of the M groups of subspaces of a first storage space includes N data units for respectively storing N values on the X-axis that have been obtained in sampling; each of the M groups of subspaces of a second storage space includes N data units for respectively storing N values on the Y-axis that have been obtained in sampling; each of the M groups of subspaces of a third storage space includes N data units for respectively storing N values on the Z-axis that have been obtained in sampling. Herein, N is an integer greater than or equal to 1

Thus, to convert the values stored in the M groups of subspaces of each of the first, second and third storage spaces, the second method performs the following steps.

For the X-axis, the method includes the following steps:

x1. selecting a first group as the current group;

x2. subtracting a first still value from the N values stored in the current group and comparing the differences between the N values and the first still value with a preset first threshold value to obtain N comparison results, wherein the N comparison results are obtained as follows. If a difference is larger than the preset first threshold value, the corresponding comparison result is 1; if a difference is smaller than the minus preset first threshold value (i.e., a negative preset first threshold value). the corresponding comparison result is −1; if the absolute value of a difference is smaller than the preset first threshold value, the corresponding comparison result is 0;

x3. counting the N comparison results of the current group and taking one of 1, −1 and 0 whose number of the N comparison results is the maximum as the X-axis motion identifier corresponding to the current group of subspace;

x4. selecting the next group as the current group and returning to x2 unless all of the M groups of subspaces are processed.

Similar steps y1 to y4 and z1 to z4 occur for the Y-axis and Z-axis, respectively.

As described above, the processing methods for values on the X-axis, Y-axis, and Z-axis are similar. All of these methods subtract a corresponding still value from the N data in a group of subspace, to compare the differences with a corresponding threshold value to determine whether the differences fall within or outside a range of the threshold, and to determine the motion identifier of the group of subspace based on results of the comparison. Since each storage space has M groups of subspaces, M motion identifiers are obtained in all of the these methods after the above processing is performed. The M motion identifiers can represent a motion trace on a certain axis as in the first method. Of course, a motion trace identified by the second method should be more accurate than that by the first method since factors such as inaccurate operation of a user and an error of the sensor is eliminated in the second method.

Moreover, all of the first still value, the second still value and the third still value represent no motion. They are the same or different. Similarly, each of the first threshold value, the second threshold value and the third threshold value represents a certain range.

Step 204, the controller 100 matches the identified motion trace with a preset motion trace, and executes a control command mapped to the preset motion trace to control an application in the mobile terminal if the matching succeeds.

This step compares the X-axis motion identifier, the Y-axis motion identifier and the Z-axis motion identifier and determines whether the matching has succeeded based on the results of the comparisons. The control command mapped is automatically executed and thereby the application in the mobile terminal is controlled if the matching succeeds.

In another embodiment of the present invention, it is assumed that a sampling frequency of the acceleration sensor 104 in a mobile terminal is 400 Hz, i.e., the acceleration sensor collects data once every 0.0025 seconds. That is, every second, 400 pieces of data on the X-axis, 400 pieces of data on the Y-axis and 400 pieces data on the Z-axis are collected. It is also assumed that each of a first storage space, a second storage space and a third storage space to store sampled data includes M groups of subspaces, each of which includes N data units. Herein, M=8, and N=50. In this embodiment, the first storage space, the second storage space and the third storage space are shown using queue 1, queue 2, queue 3, respectively. Each of the queues has 8 nodes and each of the nodes includes 50 data units. Moreover, the sampled data is stored in an order of queue head to queue tail when sampled data are HI stored. The data at the queue head is deleted and a node storing the new sampled data is inserted to the queue tail when data units of all of the nodes are occupied. That is, in this embodiment, each of the queues always stores the 400 sampled data that have been last obtained. Sampled data is stored in another data structure other than a queue.

Moreover, it is also assumed in this embodiment that the controller 100 has an application control-setting module that operates in two modes, i.e., a motion trace-presetting mode and a motion trace-identifying mode.

Figure 3:
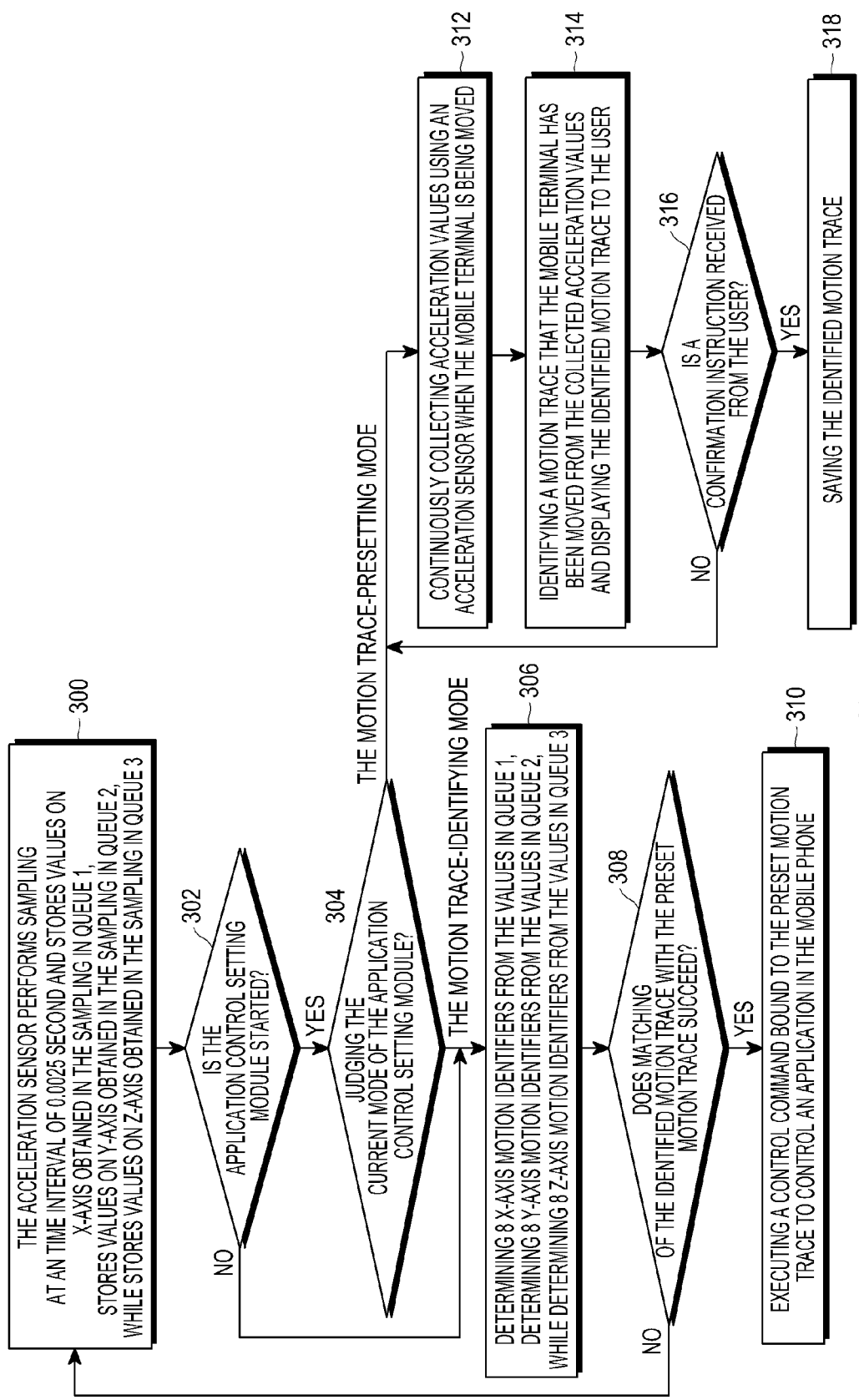
FIG. 3 illustrates a flowchart according to a second embodiment of the present invention.

FIG. 3 shows a flowchart of the method of this embodiment. Referring to FIG. 3, the controller 100 allows the acceleration sensor 104 to perform sampling at an rate of 0.0025 second and to store values on the X-axis obtained in the sampling in queue 1, store values on the Y-axis obtained in the sampling in queue 2, while store values on the Z-axis obtained in the sampling in queue 3, when the mobile terminal is being moved in step 300.

Figure 4A:
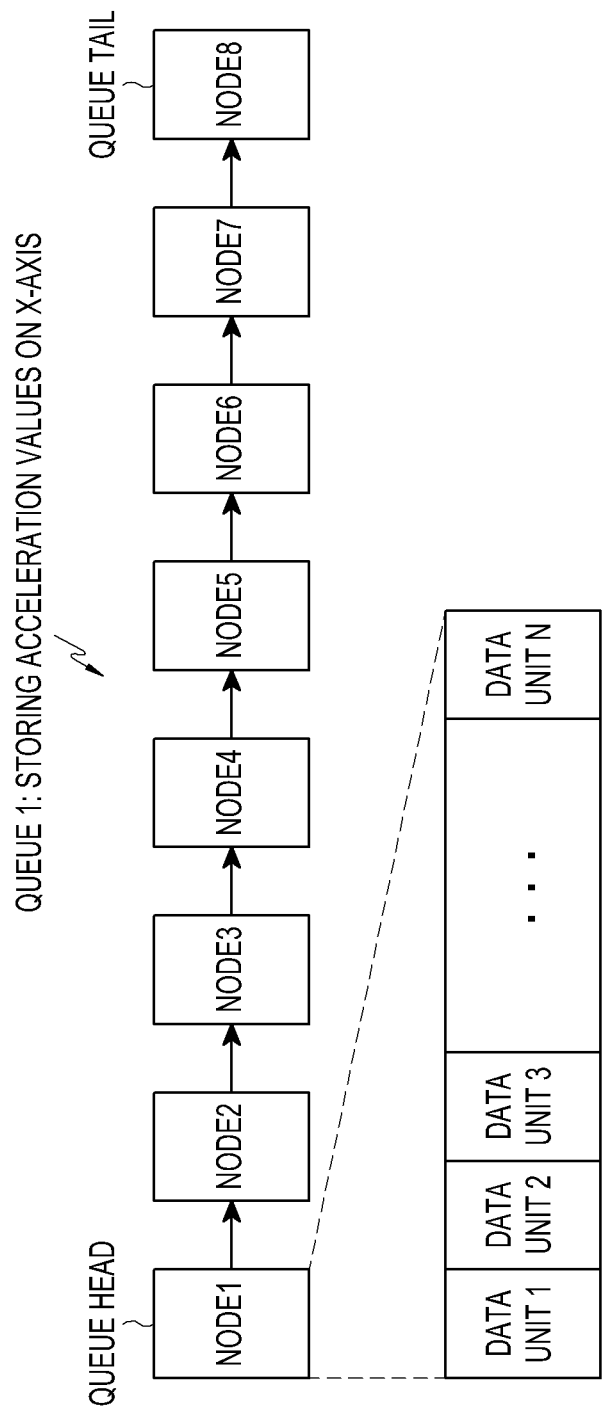
FIG. 4A illustrates queue 1 for storing sampled data on X-axis according to embodiments of the present invention.
Figure 4B:
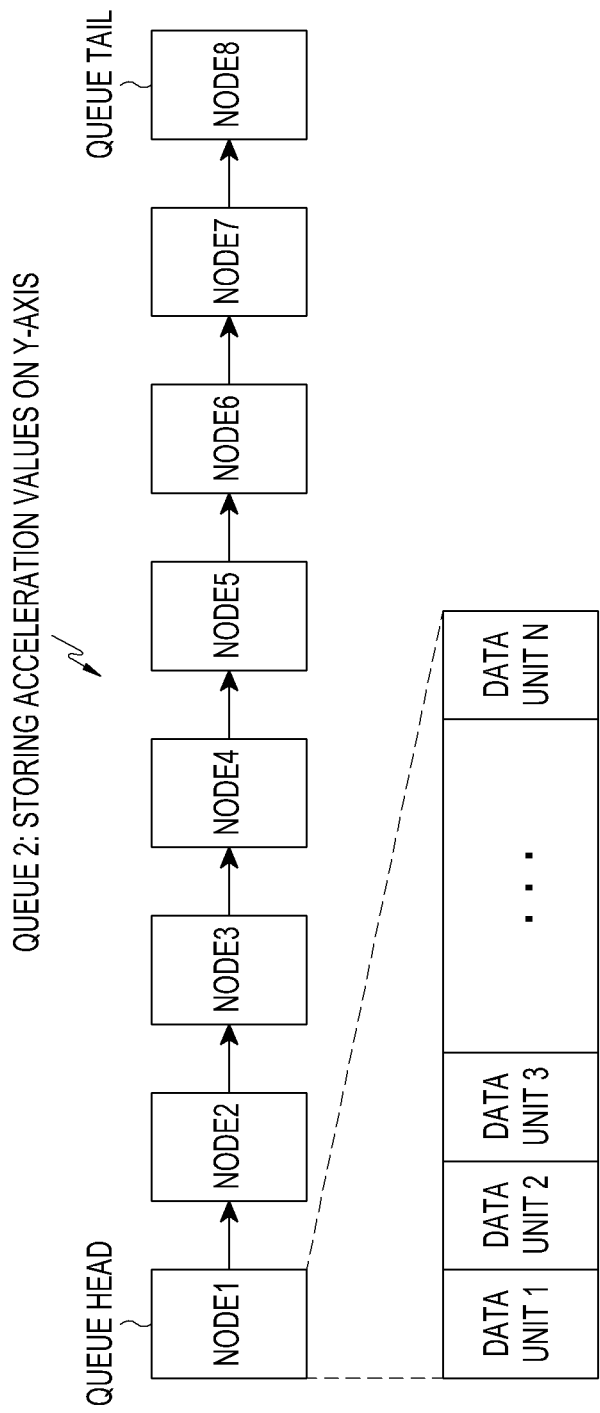
FIG. 4B illustrates queue 2 for storing sampled data on Y-axis according to embodiments of the present invention.
Figure 4C:
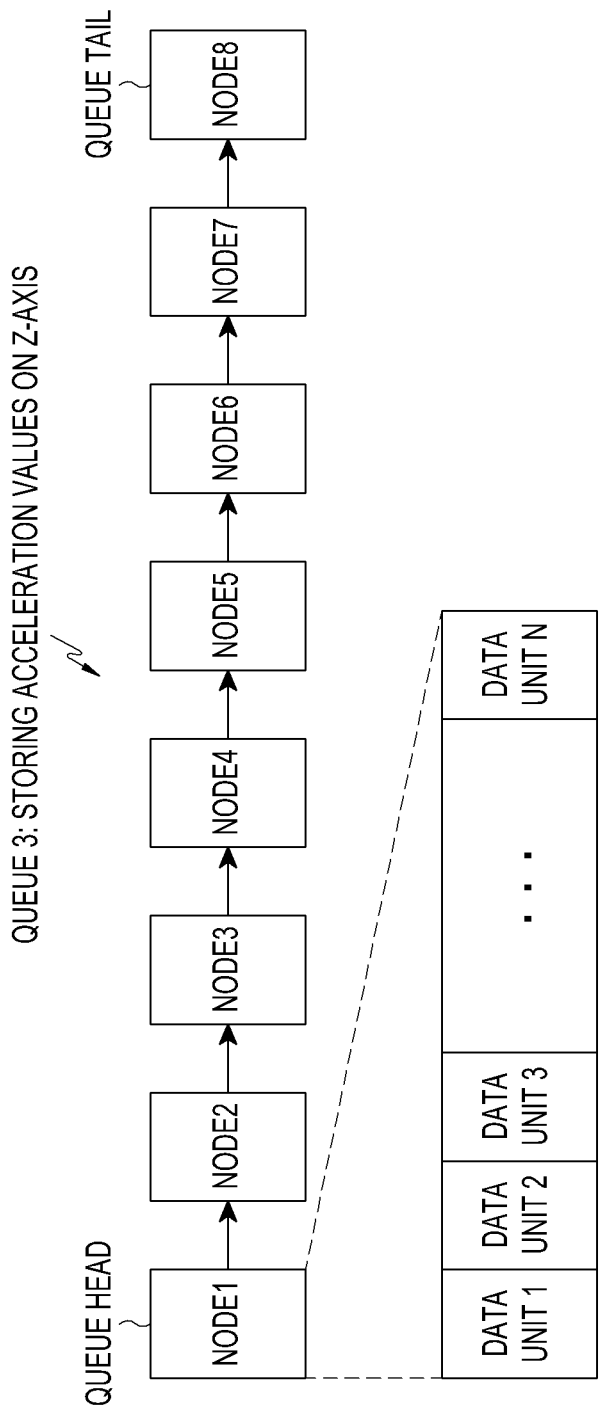
FIG. 4C illustrates queue 3 for storing sampled data on Z-axis according to embodiments of the present invention.

Queues 1, 2 and 3 in this step is shown as in FIGS. 4A to 4C, respectively. As described above, the sampled data is stored in the order of queue head to queue tail. For example, the first group of 50 data are placed at the head node of a queue when 50 pieces sampled data are obtained. After 0.125 seconds (50*0.0025 seconds), the second group of 50 sampled data is stored at the second node. After another 0.125 seconds, the third group of 50 sampled data is stored at the third node, and so on. When all of 8 nodes of a queue are full, data at the head node of the queue is deleted and the node storing the 50 sampled data that have been recently obtained is stored at the tail of the queue. In sum, each of queues 1, 2 and 3 always stores the 400 pieces of data that have been obtained lately.

In step 302, the controller 100 determines whether the application control-setting module is running, and if so, step 304 is performed. Otherwise, step 306 is performed.

In step 304, the controller 100 determines the current mode for the application control-setting module. If the current mode is the motion trace-presetting mode, step 312 is performed. If the current mode is the motion trace-identifying mode, step 306 is performed.

In this embodiment, the application control-setting module is provided in the mobile terminal and the function of motion trace presetting or motion trace identifying is started by the application control-setting module. However, the application control-setting module is not provided in practical applications. Whether the application control-setting module is present does not affect the implementation of the solution, and steps 302 and 304 may be omitted.

In step 306, 8 X-axis motion identifiers are determined from the values in queue 1, 8 Y-axis motion identifiers are determined from the values in queue 2, and 8 Z-axis motion identifiers are determined from the values in queue 3.

Determining the 8 X-axis motion identifiers can be done in the method of the above steps x1 to x4, determining of the 8 Y-axis motion identifiers can be done in the method of the above steps y1 to y4, and determining of the 8 Z-axis motion identifiers can be done in the method of the above steps z1 to z4, all of which will not be described herein.

All of the nodes of a queue do not store sampled data when sampling has just started. For example, only the head node of the queue stores sampled data while none of the other nodes stores data at 0.125 second. Thus, only the motion identifier corresponding to the head node of the queue can be determined. After 0.125 second, the second node of the queue also stored sampled data as described in step 300. Thus, the motion identifier corresponding to the second node can be determined. Herein, the queue and the motion identifiers are not specified and can be for the X-axis, Y-axis or Z-axis.

Additionally, since an error may occur during operation, a first still value, a second still value and a third still value are be further updated in this step when the 8 X-axis motion identifiers, the 8 Y-axis motion identifiers and the 8 Z-axis motion identifiers are determined. That is, between steps x3 and x4, the method further includes the following step to be performed when the 8 X-axis motion identifiers are determined. Determining whether the X-axis motion identifier corresponding to the current group is 0 and. if so, calculating a mean of the N values (N values on the X-axis) of the current group and updating the first still value as the calculated mean; otherwise, returning to step x4. A similar step can occur between steps y3 and y4 and z3 and z4.

These steps are used to update the still values because during the operation by a user, a mobile terminal is substantially still if a motion identifier corresponding to the current group of data is 0. However, all of the N (in this embodiment, N is 50) pieces of data of the current group on each of the axes are not necessarily equal to the still value due to an error of operation or measurement. Thus, if the still value is set as a mean of the N values, the N values as a whole are closer to the still value, thereby, avoiding the case that the mobile terminal is not being moved is mistaken for being moved.

In step 308, the identified motion trace is matched with a preset motion trace, and step 310 is performed if the matching succeeds. Otherwise, the process returns to step 300.

Steps 300 to 308 form a large cycle, in which the acceleration sensor 104 in the mobile terminal performs sampling continuously and accesses the queues every 0.125 second. Accordingly, a motion trace is identified for the mobile terminal every 0.125 second. The identification may fail within the first one second from when sampling is started since all of the nodes in a queue do not store data and thus the determined 8 motion identifiers are inaccurate. However, all the nodes in the queue store sampled data after the one second. Thereby, effective 8 motion identifiers can be determined. As described in an embodiment above, X-axis motion identifiers, Y-axis motion identifiers and Z-axis motion identifiers represent a motion trace that a mobile terminal has been moved. In this embodiment, a preset motion trace is also represented using X-axis motion identifiers, Y-axis motion identifiers and Z-axis motion identifiers. Thus, whether the matching succeeds is determined by comparing the 8 X-axis motion identifiers, the 8 Y-axis motion identifiers and the 8 Z-axis motion identifiers determined in step 306 with the 8 X-axis motion identifiers, the 8 Y-axis motion identifiers and the 8 Z-axis motion identifiers of the preset motion trace, respectively.

The matching does not necessarily succeed at once after the one second of sampling. However, as described in step 300, the acceleration sensor may continue with sampling, new motion identifiers may be determined from the sampled data that have been obtained lately for the mobile terminal, and matching with the preset motion trace is made in step 308 again. Once the matching succeeds, the next step 310 is performed.

The matching in step 308 is performed in a manner of exact match or a manner of approximate matching in practical applications. The manner of exact matching means that the 8 X-axis motion identifiers, the 8 Y-axis motion identifiers and the 8 Z-axis motion identifiers of an identified motion trace are the same as the 8 X-axis motion identifiers, the 8 Y-axis motion identifiers and the 8 Z-axis motion identifiers of a preset motion trace, respectively. The manner of approximate matching means that the motion identifiers on the three axes are not completely the same but a number of pairs of motion identifiers being the same is larger than a preset matching threshold value. For example, a matching threshold value is preset as 6 and 7 motion identifiers on each of the axes of an identified motion trace are the same as those of a preset motion trace, respectively. In this case, the number, 7, is larger than the matching threshold value 6. This would be a case of matching succeeding.

A time threshold value also can be set. Identification is not performed anymore (i.e., no return to step 300) to avoid an infinite loop when the threshold value is exceeded.

In step 310, a control command mapped to the preset motion trace is executed to control an application in the mobile terminal, and this procedure is completed.

In step 312, acceleration values are continuously collecting using an acceleration sensor 104 when a mobile terminal is being moved. The same method as that for step 300 can be used for this step and will not be described herein.

In step 314, a motion trace that the mobile terminal has been moved is identified from the collected acceleration values and the identified motion trace is displayed to the user through the display 106.

The same method as that in step 306 is used to identify the motion trace. Moreover, after the motion trace is identified, the motion trace is visualized as a character to be displayed to the user through the display 106 for the convenience of confirmation by the user.

In step 316, whether a confirmation instruction is received from the user is determined, and if the confirmation instruction is received through the input/output interface 108, step 318 is performed. Otherwise, return to step 312.

In step 318, the identified motion trace is saved and this procedure is completed.

A preset motion trace occurs in steps 312 to 318. If there is an application control-setting module in a mobile terminal, this module also can provide functions of displaying, searching for, associating and deleting a preset motion trace for more exact operation by a user. Steps 312 to 318 make a preset motion trace and are not necessary in an identifying process. Thus, they can be omitted in identifying a motion trace and controlling an application.

It is easy to bind a control command to a preset motion trace in applications. For example, a database is provided to store corresponding relationships between preset motion traces and control commands. Thus, after matching succeeds in step 308, the motion trace whose matching succeeds is searched for in the database and a corresponding control command is executed.

Figure 5A:
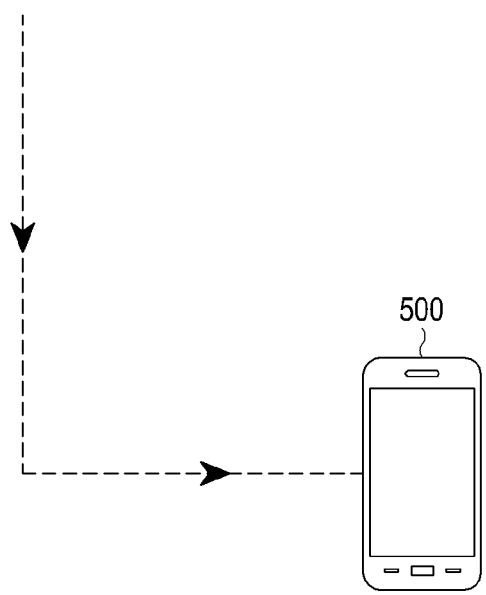
FIG. 5A illustrates writing the character of "L" with a mobile terminal according to embodiments of the present invention.
Figure 5B:
FIG. 5B illustrates executing an application after the character "L" is written with a mobile terminal according to embodiments of the present invention.

FIGS. 5A, 5B, 6A, and 6B each show examples illustrating controlling an application in accordance with an embodiment of the present invention. As shown in FIG. 5A, a user writes the character, "L", with a handheld mobile terminal in the air. A motion trace is formed during motion of the mobile terminal. Supposing that this motion trace is preset in the mobile terminal and is mapped to the control command of "Opening" the application "Notepad", "Notepad" is automatically opened once the matching succeeds. The result is shown in FIG. 5B.

Figure 6A:
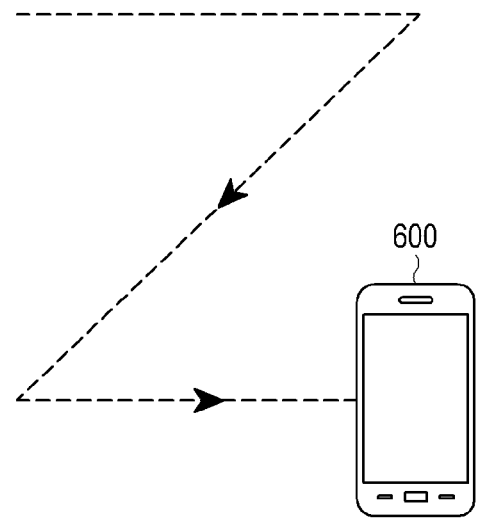
FIG. 6A illustrates writing the character of "Z" with a mobile terminal according to embodiments of the present invention.
Figure 6B:
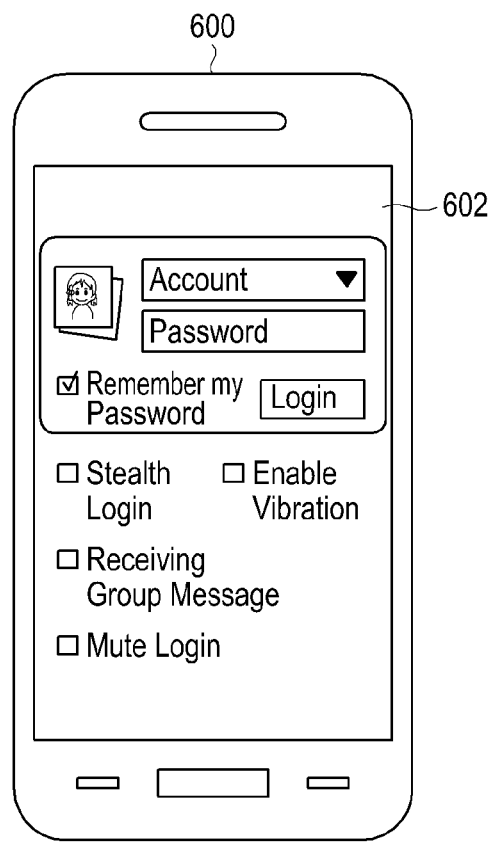
FIG. 6B illustrates executing an application after the character "Z" is written with a mobile terminal according to embodiments of the present invention.

In another example, as shown in FIG. 6A, a user writes the character, "Z", with a handheld mobile terminal in the air. A motion trace is formed during motion of the mobile terminal. Assuming that this motion trace is preset in the mobile terminal and is mapped to the control command of "Opening" the application "instant messenger", "instant messenger" is automatically opened once the matching succeeds. The result is shown in FIG. 6B.

By applying this embodiment, a motion trace formed during motion of the mobile terminal is identified by means of an acceleration sensor 104 when a user writes with a handheld mobile terminal. A corresponding control command is started when the identified motion trace succeeds in matching with a preset motion trace. Thus, the objective of controlling an application is achieved. The user can write any characters and pictures not only simple shakes with the handheld mobile terminal. Thus, a lot of motion traces can be formed and a lot of control commands can thereby be mapped. Consequently, it is possible to easily control various applications in the mobile terminal by a user writing with a handheld mobile terminal.

Embodiments of the present invention can be implemented by hardware, software, and a combination of the hardware and the software. For example, the software can be stored, regardless of possibility of omission or rewrite, in volatile or non-volatile storage devices such as memories such as a Read Only Memory (ROM), a Random Access Memory (RAM), a memory chip, a device or an integrated circuit, and optically or magnetically recordable and machine-readable storage media such as a Compact Disc (CD), a Digital Versatile Disc (DVD), a magnetic disk, a magnetic tape, and the like. A memory that can be included in the mobile terminal, is an example of a program including instructions for implementation of the embodiments of the present invention or the machine-readable storage media suitable for storing the programs. Therefore, the present invention includes a program including a code in order to implement the system or the method stated in certain claims of the specification, and the machine-readable storage media, which store such a program. Further, the program can be electronically transferred by certain media such as a communication signal transmitted through a wired or wireless connection.

The method of controlling applications in the mobile terminal according to embodiments of the present invention may be manufactured in a form of a program to be stored in a storage medium, and the mobile terminal can provide an application control to a user by downloading a program (e.g., an application) for controlling applications from a program-providing server, installing the downloaded program, and executing the installed program. That is, when the program for controlling the application is installed in the mobile terminal, the program is executed and then the application control is provided to the user. The program-providing server receives a transmission request for the program from the mobile terminal and responds to the transmission request to transmit the program to the mobile terminal. The program-providing server can determine whether the mobile terminal having made the transmission request for the program is a subscriber terminal and further perform a user authentication and a payment information identification. The program-providing server can include a storage medium storing the program. Further, the storage medium may be located inside the program-providing server or outside the program-providing server.

While the present invention has been shown and described with reference to certain embodiments and drawings thereof, it will be understood by those skilled in the art that various changes in form and details may be made therein without departing from the spirit and scope of the invention as defined by the appended claims and their equivalents.

What is claimed is:

1. A method of controlling applications in a mobile terminal, the method comprising:
    presetting a motion trace for the mobile terminal:
    binding the preset motion trace to a control command of an application, prior to collecting acceleration values:
    collecting the acceleration values continuously using an acceleration sensor, when the mobile terminal is being moved;
    identifying a motion trace of the mobile device, indicating that the mobile terminal has been move, from the collected acceleration values;
    matching the identified motion trace with the preset motion trace; and
    executing a control command mapped to the preset motion trace to control an application in the mobile terminal, if the matching succeeds.

2. The method of claim 1, wherein each of the acceleration values is a vector including a value on an X-axis, a value on an Y-axis, and a value on an Z-axis, and wherein collecting the acceleration values comprises:
    performing sampling at a preset time interval, by the acceleration sensor, when the mobile terminal is moved, and storing in a first storage space including M groups of subspaces, values on the X-axis obtained in the sampling, storing in a second storage space including M groups of subspaces, values on the Y-axis obtained in the sampling, and storing in a third storage space including M groups of subspaces, values on the Z-axis obtained in the sampling,
    wherein M is a positive integer greater than or equal to 1.

3. The method of claim 2, wherein identifying of the motion trace comprises:
    determining M respective X-axis motion identifiers based on values in the M groups of subspaces for the values in the first storage space, wherein each of the X-axis motion identifiers is 1, −1 or 0, and wherein 1 denotes motion in an X-axis positive direction, −1 denotes motion in an X-axis negative direction, and 0 denotes no motion on the X-axis;

determining M respective Y-axis motion identifiers based on values in the M groups of subspaces for the values in the second storage space, wherein each of the Y-axis motion identifiers is 1, −1 or 0, wherein 1 denotes motion in a Y-axis positive direction, −1 denotes motion in a Y-axis negative direction, and 0 denotes no motion on the Y-axis;

determining M respective Z-axis motion identifiers based on values in the M groups of subspaces for the values in the third storage space, wherein each of the Z-axis motion identifiers is 1, −1 or 0, wherein 1 denotes motion in a Z-axis positive direction, −1 denotes motion in a Z-axis negative direction, and 0 denotes no motion on the Z-axis;

wherein the M X-axis motion identifiers, the M Y-axis motion identifiers and the M Z-axis motion identifiers are used to represent a motion trace of motion of the mobile terminal.

4. The method of claim 3, wherein the M groups of subspaces of the first storage space include N data units for respectively storing N values on the X-axis that have been obtained in sampling most recently, the M groups of subspaces of the second storage space include N data units for respectively storing N values on the Y-axis that have been obtained in sampling most recently, the M groups of subspaces of the third storage space include N data units for respectively storing N values on the Z-axis that have been obtained in sampling most recently, and wherein N is an integer greater than or equal to 1.

5. The method of claim 4, wherein determining the M respective X-axis motion identifiers based on values in the M groups of subspaces, determining of the M respective Y-axis motion identifiers based on values in the M groups of subspaces, and determining of the M respective Z-axis motion identifiers based on values in the M groups of subspaces comprises:

selecting a first group of subspaces as the current group;

subtracting a still value from the N values stored in the current group and comparing the differences between the N values and the still value with a preset threshold value to obtain N comparison results, wherein the N comparison results are obtained as follows: if a difference is larger than the preset threshold value, the corresponding comparison result is 1; if a difference is smaller than the minus preset threshold value, the corresponding comparison result is −1; and if the absolute value of a difference is smaller than the preset threshold value, the corresponding comparison result is 0;

counting the N comparison results of the current group and taking one of 1, −1 and 0 whose number of the N comparison results is the maximum as a motion identifier of a corresponding axis among the X-axis motion identifier, the Y-axis motion identifier, and the Z-axis motion identifier corresponding to the current group of subspace; and selecting the next group as the current group and returns to the second step unless all of the M groups of subspaces are processed.

6. The method of claim 5, further comprising:

determining whether the motion identifier of the corresponding axis corresponding to the current group is 0; and calculating a mean of the N values of the current group and updating the still value as the calculated mean.

7. The method of claim 1, wherein presetting a motion trace for the mobile terminal comprises:

collecting acceleration values using the acceleration sensor continuously when the mobile terminal is being moved;

identifying a motion trace indicating that the mobile terminal has been moved, from the collected acceleration values; displaying the identified motion trace to a user; and saving the identified motion trace, when a confirmation instruction is received from the user; otherwise, returning to the first step.

8. A mobile terminal, comprising:

an acceleration sensor for detecting an acceleration when the mobile terminal is being moved; and a controller for presetting a motion trace of the mobile terminal, binding the preset motion trace to a control command of an application, prior to collecting acceleration values, collecting the acceleration values continuously using the acceleration sensor, when the mobile terminal is being moved, identifying a motion trace of the mobile terminal, indicating that the mobile terminal has been moved, from the collected acceleration values, matching the identified motion trace with the preset motion trace, and executing a control command mapped to the preset motion trace to control applications in the mobile terminal, if the matching succeeds.

9. The mobile terminal of claim 8, further comprising:

a memory for providing first, second, and third storage spaces including respective M groups of subspaces, wherein the acceleration value is a vector including a value on the X-axis, a value on the Y-axis, and a value on the Z-axis and, when collecting the acceleration values, the controller performs sampling at a time interval preset by the acceleration sensor when the mobile terminal is being moved and stores values on the X-axis obtained during the sampling in the M groups of subspaces of the first storage space, stores values on the Y-axis obtained in the sampling in the M groups of subspaces of the second storage space, and stores values on the Z-axis obtained in the sampling in the M groups of subspaces of the third storage space, wherein M is a positive greater than or equal to 1.

10. The mobile terminal of claim 9, wherein, the controller determines M respective X-axis motion identifiers based on values in the M groups of subspaces for the values in the first storage space, when the motion trace is identified, wherein each of the X-axis motion identifiers is 1, −1 or 0, wherein 1 denotes motion in an X-axis positive direction, −1 denotes motion in an X-axis negative direction, and 0 denotes no motion on the X-axis, determines M respective Y-axis motion identifiers based on values in the M groups of subspaces for the values in the second storage space, wherein each of the Y-axis motion identifiers is 1, −1 or 0, wherein 1 denotes motion in Y-axis positive direction, −1 denotes motion in a Y-axis negative direction, and 0 denotes no motion on the Y-axis and determines M respective Z-axis motion identifiers based on values in the M groups of subspaces for the values in the third storage space, wherein each of the Z-axis motion identifiers is 1, −1 or 0, wherein 1 denotes motion in a Z-axis positive direction, −1 denotes motion in a Z-axis negative direction, and 0 denotes no motion on the Z-axis, and the M X-axis motion identifiers, the M Y-axis motion identifiers and the M Z-axis motion identifiers are used to represent a motion trace of motion of the mobile terminal.

11. The mobile terminal of claim 10, wherein the M groups of subspaces of the first storage space include N data units for respectively storing N values on the X-axis that have been obtained in sampling most recently, the M groups of subspaces of the second storage space include N data units for respectively storing N values on the Y-axis that have been obtained in sampling most recently and the M groups of subspaces of the third storage space include N data units for respectively storing N values on the Z-axis that have been obtained in sampling most recently, wherein N is an integer greater than or equal to 1.

12. The mobile terminal of claim 11, wherein, when determining the M respective X-axis motion identifiers based on values in the M groups of subspaces, determining of the M respective Y-axis motion identifiers based on values in the M groups of subspaces, and determining of the M respective Z-axis motion identifiers based on values in the M groups of subspaces, respectively, the controller subtracts a still value from the N values stored in the respective M groups and compares the differences between the N values and the still value with a preset threshold value to obtain N comparison results, and counts the N comparison results of the current group and takes one of 1, −1 and 0 whose number of the N comparison results is the maximum as a motion identifier of a corresponding axis among the X-axis motion identifier, the Y-axis motion identifier, and the Z-axis motion identifier corresponding to the current group of subspace, wherein the N comparison results are obtained as follows:
if a difference is larger than the preset threshold value, the corresponding comparison result is 1; if a difference is smaller than the minus preset threshold value, the corresponding comparison result is −1; if the absolute value of a difference is smaller than the preset threshold value, the corresponding comparison result is 0.

13. The mobile terminal of claim 12, wherein the controller calculates a mean of the N values of the current group and updates the still value as the calculated mean, if the motion identifier on the corresponding axis is 0.

14. The mobile terminal of claim 8, wherein, when presetting a motion trace for the mobile terminal, the controller continuously collects the acceleration values using the acceleration sensor when the mobile terminal is being moved, identifies a motion trace that the motile terminal has been moved, from the collected acceleration values, displays the identified motion trace to a user, and stores the identified motion trace, when a confirmation instruction is received from the user.

* * * * *